July 12, 1927.
F. H. KIRCHMAN
1,635,217
PROCESS OF WELDING MANGANESE STEEL TO CARBON STEEL
Filed Oct. 5, 1926
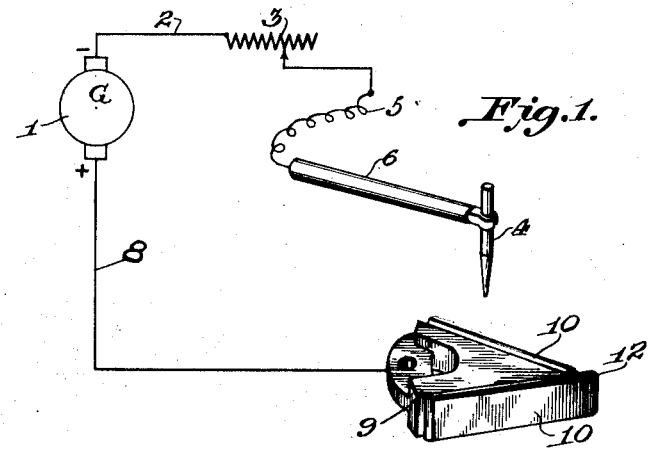
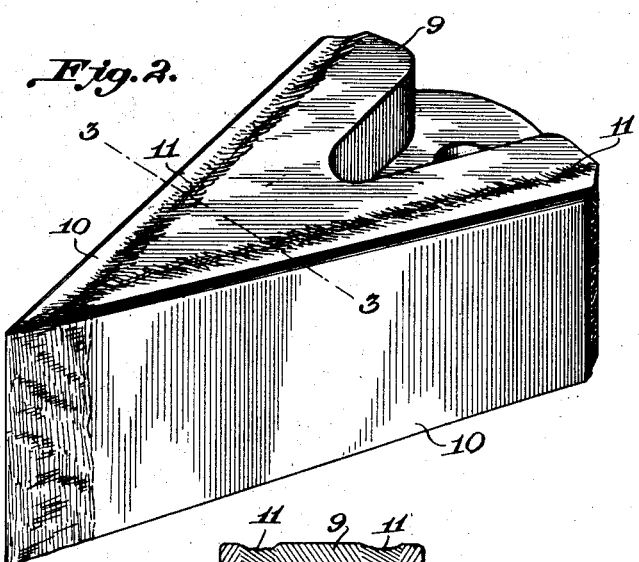
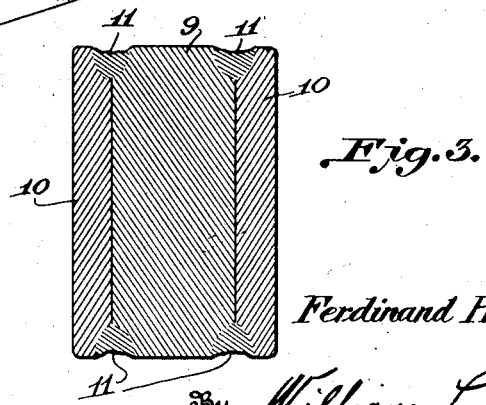
Inventor
Ferdinand H. Kirchman.
By William C. Linton.
Attorney Patented July 12, 1927.

1,635,217

UNITED STATES PATENT OFFICE.

FERDINAND H. KIRCHMAN, OF WASHINGTON, DISTRICT OF COLUMBIA, ASSIGNOR TO EDWARD C. FOSTER, OF WASHINGTON, DISTRICT OF COLUMBIA.

PROCESS OF WELDING MANGANESE STEEL TO CARBON STEEL.

Application filed October 5, 1926. Serial No. 139,671.

The present invention relates to a new and improved process for welding manganese steel to carbon steel either high or low carbon steel. The process is also applicable to welding cast or wrought iron to manganese steel. More particularly my invention relates to a new and improved process for welding the high carbon steel plates to the manganese steel bodies of the teeth employed on the buckets or scoops of steam shovels, earth excavators, or dredges.

In the excavation of earth by dredges, steam shovels and the like, it is customary to have teeth upon the working surface of the bucket, shovel or scoop. These teeth are usually composed of a body of manganese steel to which plates of high carbon steel are attached. The plates of carbon steel form the working surface and hence must be firmly attached to the body of manganese steel.

Up to the present time no satisfactory means are known to securely attach these carbon steel plates to the manganese steel bodies. The process of electrically welding these steel plates by using a steel rod as the negative pole has been attempted, but the results are very unsatisfactory, as the carbon steel plate readily parts from the manganese steel body under comparatively very low strains. Either the metal which forms the weld pulls away from the manganese steel body or the weld breaks in its interior as a brittle body. Further the weld, when made electrically with a steel or iron rod connected to the negative pole of the source of electrical energy, appears to be permeated with very minute cells or bubbles which might account for the brittleness of the weld. When steel plates are welded to the manganese steel bodies of the teeth by means of a steel or iron rod as described, they cannot and do not successfully resist the great pulls and strains required of them, and the result is that the carbon steel plates are soon separated or torn from the manganese steel body. By the process of the present invention the carbon steel plates are firmly and permanently united to the manganese steel bodies, and the forces usually experienced in operating them cannot and does not cause the plate to separate from the tooth body.

Although I have described my invention as applied to welding carbon steel plates to the manganese steel bodies of the teeth of shovels, buckets or scoops of steam shovels, dredges and the like, it only forms one species of my invention. My process may also be applied to the welding of high or low carbon steel, iron, as wrought or cast, to manganese steel or steel containing manganese in general, without reference to the particular body to be formed or formed of the manganese steel.

My invention will now be described in detail referring to the accompanying drawing wherein similar numerals indicate corresponding parts.

Fig. 1 shows the general arrangement of the apparatus for practicing my invention and the tooth in position for welding;

Fig. 2 shows a perspective view of the tooth; and

Fig. 3 shows a section on the line III—III of Fig. 2.

The source of electrical energy for performing the process is indicated by the numeral 1 in Fig. 1. A low resistance wire 2, leads from the negative pole of the generator 1 to the variable resistance 3. The variable resistance 3 is connected to the carbon rod 4 by means of the low resistance wire 5 passing through the insulated handle 6 adapted to securely hold the carbon rod or body. The low resistance wire 8 connects the bodies to be welded with the positive pole of the source of electricity. By adjusting the variable resistance 3 the value of the current in the circuit can be regulated as well as the fall of potential between the carbon rod and the bodies to be welded. In practice I prefer to employ a current of from 275 to 350 amperes under a potential difference of from 75 to 95 volts, although variations may be introduced as will be understood by persons skilled in the art. In welding the carbon steel plates to the manganese steel bodies of the teeth a carbon rod of approximately five-eights of an inch and tapered at the end nearer the body to be welded gives excellent results, although it should be appreciated that the size of the rod is to be regulated in accordance with the intensity of the heat or current desired to be employed.

In the accompanying drawings the manganese steel body of the tooth is indicated by the numeral 9 while the carbon steel plates are indicated by the numeral 10. To produce the weld the carbon rod is touched to the surface of the bodies to be welded which should be placed in the position in which they are to be connected. The carbon is then separated from the bodies to produce an arc which should be regulated to spread partly upon the manganese steel and partly upon the high carbon steel. This regulation may be accomplished by positioning and moving the handle 6. The heating should be so conducted that there takes place an interfusion of the manganese and high carbon steels. This interfusion or mixing of the molten metal can be readily seen by the operator performing the welding, and the length of the weld may be produced by merely slowly moving the rod 4 in the direction desired. The penetration of the weld between the two contacting surfaces of the tooth body 9 and the high carbon steel plates 10 may be increased or decreased by holding the carbon rod 4 more or less time at a given point. In welding the carbon steel plates 10 to the body 9 a penetration of about one-half to three-quarters of an inch usually suffices to resist the heaviest loads to which such plates are subjected.

The welding of the carbon steel plates is preferably so conducted that approximately as much of the body of manganese steel is fused as of the carbon steel plates, as will fully appear from an inspection of the welds 11 of Figs. 2 and 3. In applying the carbon steel plates to the tooth body, one of them is usually left a little longer than the other as shown at 12 in Fig. 1 and the welds 11 then made throughout their lengths. The plates then are brought to a point by cutting off the part 12 with a bevel to correspond with the plane of the opposite side of the tooth as clearly shown in Fig. 2.

While electric welders have at certain times used carbon rods for certain welding operations, it was never appreciated until my invention that carbon rods could or would give a permanent and satisfactory weld of carbon steel to manganese steel. The limits to the use of the carbon rod were early appreciated and hence the resort to steel or other welding rods. Welders heretofore were unsuccessful in making welds of the character herein described.

I am unable to explain with absolute certainty why a carbon rod will produce a satisfactory and substantially permanent weld. It may be that the carbon establishes a reducing atmosphere which prevents the oxidation of the manganese, and that the resulting oxide, if present, would permeate the weld and also prevent firm adherence of the molten metal to the manganese. On the other hand, it might be that oxidation of the carbon in the carbon steel takes place when carbon rods are not used and that the liberation of the gases produce a porous or cellular weld. It may also be that the presence of the carbon rod induces the formation of some intermediate alloy or steel which has good adhering qualities to both the carbon steel and manganese steel. Whatever may be the reason or theory of the result, it is clear that an extraordinarily tough and permanent weld is obtained by my process, whereas the unsatisfactory results described above are obtained when steel rods are used.

Having described my invention, what I claim is:

1. A tooth for the bucket, shovel or scoop, of a dredge or earth excavator having a body of manganese steel and a carbon steel face, the body and the face being joined by intermixing of their fused metals substantially free from external addition of metal.

2. The process of uniting the manganese steel body of a tooth for an earth excavator or dredge with a facing of iron or steel which comprises bringing the facing of manganese steel into close relationship with a solid body of iron or steel, bringing proximate parts of said bodies to their fusion points substantially in the absence of additions of extraneous metal and causing said fused parts to intermingle to form a connection between said bodies.

3. The process of forming a weld between a body of manganese steel of a tooth of an earth excavator or dredge and a facing of carbon steel or iron which comprises bringing said bodies adjacent to each other and causing the flow of a direct current of electricity to take place between the vicinity of the adjacent parts and a body composed essentially of carbon, said current being of sufficient intensity to cause the said metals to fuse and join at their adjacent parts.

4. A tooth for the bucket, shovel or scoop of a dredge or earth excavator having a body of manganese steel and a facing of carbon steel or iron, the body and the facing being joined by fusing and intermixing their adjacent parts by an electric arc from a non-consuming electrode.

In witness whereof I have hereunto set my hand.

FERDINAND H. KIRCHMAN.